M. W. SHOGREN.
DRAFT TONGUES FOR AGRICULTURAL IMPLEMENTS.
APPLICATION FILED OCT. 11, 1912.
1,093,488.  Patented Apr. 14, 1914.
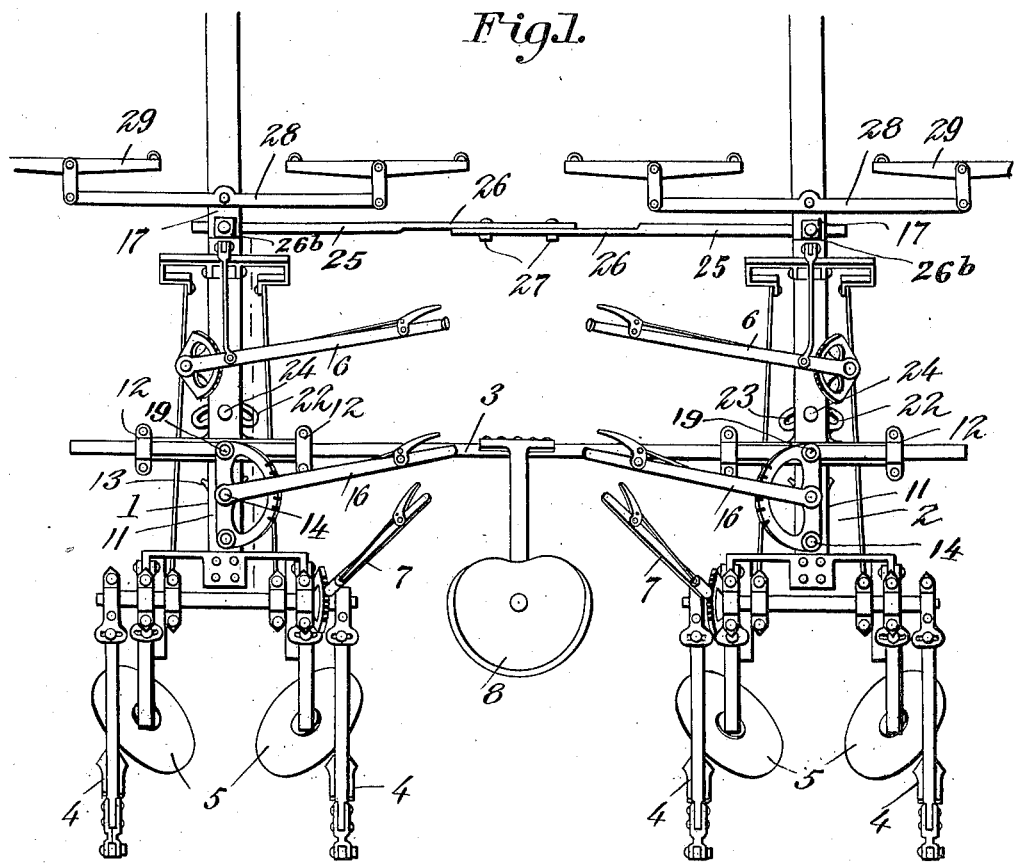
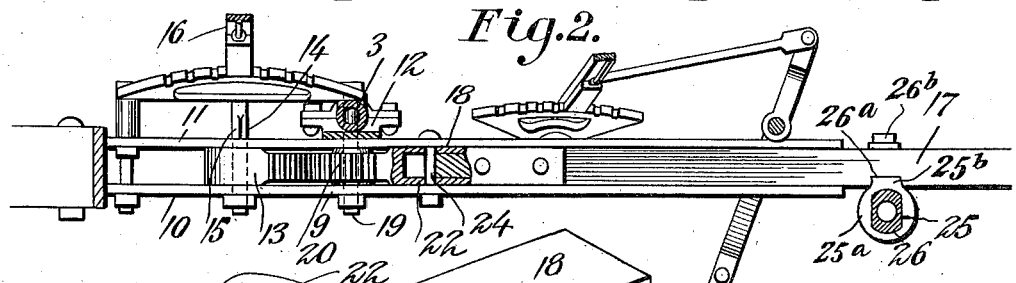
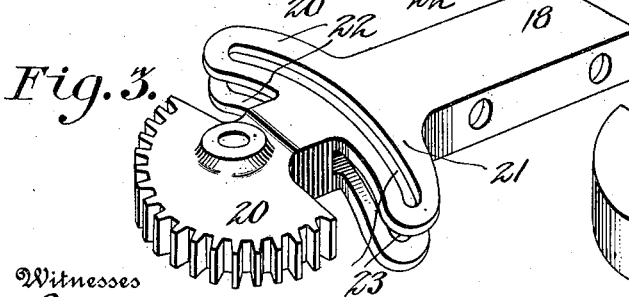
Inventor
M. W. Shogren
By Victor J. Evans
Attorney

UNITED STATES PATENT OFFICE.

MARTIN WALTHER SHOGREN, OF LOUISVILLE, NEBRASKA.

DRAFT-TONGUES FOR AGRICULTURAL IMPLEMENTS.

1,093,488.  Specification of Letters Patent.  Patented Apr. 14, 1914.

Application filed October 11, 1912. Serial No. 725,288.

*To all whom it may concern:*

Be it known that I, MARTIN WALTHER SHOGREN, a citizen of the United States, residing at Louisville, in the county of Cass and State of Nebraska, have invented new and useful Improvements in Draft-Tongues for Agricultural Implements, of which the following is a specification.

This invention relates to draft tongues for agricultural implements such as lister corn cultivators. In cultivating soil on side hills when employing a cultivator including a rigidly connected cultivator frame and draft pole it is impossible to regulate the line of draft so as to cause the draft animals to travel in the ditches and the cultivating disks to also properly follow the ditches. The drift of the cultivator frame when working upon the hill creates an irregular line of draft and the cultivation of the soil is detrimental to the plants, the draft animals traveling too high upon the ridges and side hills which causes the cultivator to assume a position angularly to the line of draft and the cultivator disks and shovel are compelled to dig through the ridges with the obvious resulting disturbance of the roots.

Now, it is an object of the present invention to provide means whereby the draft pole and the cultivator frame are adjustable relatively so that the draft animal may be made to travel with such respect to the drift of the cultivator as to cause the latter and the draft animal to properly follow in the ditches, thereby eliminating the destruction of the ridges during the cultivation of the soil on side hills.

In the drawings, forming a portion of this specification and in which like numerals of reference indicate similar parts in the several views:—Figure 1 is a top plan view of a lister cultivator showing the application of the invention thereto. Fig. 2 is a fragmentary side elevation of the left cultivator frame and the draft tongue looking outwardly. Fig. 3 is a perspective view of the combined socket member and rack segment. Fig. 4 is a perspective view of the lever segment.

The cultivator herein shown and which is provided with my improved attachment is of the listed type, and comprises the parallel cultivator frames 1 and 2, which are slidably connected with the frame bar 3. Each frame includes the cultivator shovels 4, the disks 5, and the adjusting levers 6 and 7 operatively connected with the cultivator shovels and disks, respectively, and which are provided as means for adjusting the same. These levers all extend toward a common point, being preferably arranged in close proximity to the operator's seat 8, the latter being secured in any suitable well known manner to the frame bar 3.

The bar 3 is attached to the body portion 9 of each cultivator frame, which includes the superimposed spaced plates 10 and 11, by means of the attaching brackets 12. A rack segment 13 is disposed between the spaced plates 10 and 11 and is fixed to the vertically disposed shaft 14 mounted for rotation in the said plates by means of the locking key 15, and is adapted to move in a horizontal plane. This shaft 14 is connected to a controlling hand lever 16, which extends inwardly in suitable proximity to the operator's seat 8. Each draft tongue 17 is movable at its rear end between the plates 10 and 11 and has secured to its rear extremity a socket member 18. This socket member is pivoted between the plates 10 and 11 by means of a vertically-disposed bolt member 19 and is provided with an arcuate rack 20 intermeshing with the segment 13. The socket member 18 is enlarged horizontally as at 21, to provide vertically spaced pairs of ears 22 and is provided therein with the vertically alined arcuate slots 23 adapted to receive a vertically disposed limiting pin 24 extending between the body plates 10 and 11. This pin serves to limit the lateral sweep of each draft tongue as caused by operation of the corresponding hand lever 16 in the proper direction.

The two draft tongues are connected adjacent the forward ends of the body plates 10 and 11 by the connecting rods 25, whose meeting ends are flattened, as at 26, and secured together by means of the bolts 27, thus forming a comparatively flexible connection between the two draft tongues. The eyebolt 25ª which rigidly connects each rod 25 with the corresponding tongue has its head 25ᵇ, receiving the said rod, set into a recess 26ª provided in the tongue, and is secured in this position by means of a nut 26ᵇ on the upper end of the body portion of the bolt, which latter projects through a vertical opening in the said tongue. As the draft tongues are swung laterally with respect to the cultivator as a whole, the connecting rods 25 will be bent slightly at their flattened central connection, thus permitting the lateral deflection of the draft tongues, and yet affording efficient means for causing substantially equal motion of both draft tongues, and thus facilitating the movement of the same by the operator who grasps the hand levers 16 and throws the same in the proper, opposite directions. Each draft tongue is provided with the doubletrees 28 and the swingletrees 29 for the attachment of draft animals thereto.

From the foregoing description, it is evident that, during the propulsion of the cultivator, the line of motion of the same may be deflected laterally by the controlling means provided, due to the provision of the coöperating adjusting means for both draft tongues. The draft animals through such relative arrangements of the tongues, will be caused to travel so as to propel the cultivator in a proper course relative to the rows of plants being cultivated.

When it becomes necessary to cause lateral deflection of one of the cultivator frames alone, it being understood that in this construction of cultivator the individual frames are slidably connected to the frame bar, the hand lever 16 upon the desired frame is released and the course of the draft animals attached to the corresponding draft tongue is changed so as to throw the tongue in the opposite direction to that in which it is desired the frame should move. This action causes the flattened portions 26 of the connecting rods 25 to become bent, thus serving as a fulcrum for the lever constituted by the draft tongue just referred to, whereby the desired lateral movement of the particular cultivator frame is effected. The flattened portions 26 of the connecting bars will thus be placed under tension, which will aid in restoring the tongue to its normal position when the draft animals hitched to the said tongue are directed into the ordinary course of travel.

Having thus described my invention, what I claim is:—

1. The combination with a listed cultivator including companion frames connected together in spaced relation, a pair of coacting draft tongues, each being secured pivotally to one of the frames for swinging movement in a horizontal plane, connecting bars extending inwardly from their points of rigid attachment to said tongues and centrally attached to each other, the said bars being resilient and adapted to be deflected during movement of the draft tongues and adapted to aid in returning the same to their normal positions, and means operatively connected with each draft tongue by which both tongues may be caused to swing laterally in either direction and may be secured in their different adjusted positions.

2. In combination with a listed cultivator including companion frames connected together in spaced relation, a pair of draft tongues, each tongue being pivotally connected to one of the frames for movement in a horizontal plane, an arcuate rack carried by each tongue, a gear segment operatively associated with each rack, an adjustable hand lever carried by each frame and connected to the corresponding gear segment, and yieldable means connecting the tongues to cause corresponding movement of both tongues upon operation thereof and being adapted to restore both tongues to normal position when released.

3. In a device of the class described, the combination with a listed cultivator including a transverse frame bar and a pair of relatively spaced cultivator frames slidably connected with said bar, of draft tongues connected to said frames, one of said tongues being pivotally connected to the corresponding frame for horizontal swinging movement, and a resilient connecting rod extending between the said tongues and rigidly connected thereto, the point of connection between the movable tongue and the said connecting rod being disposed in advance of the tongue pivot.

4. In a device of the class described, the combination with a listed cultivator including a transverse frame bar and a pair of relatively spaced cultivator frames slidably connected with said bar, of draft tongues connected to said frames, one of said tongues being pivotally connected to the corresponding frame for horizontal swinging movement, a resilient connecting rod extending between the said tongues and rigidly connected thereto, the point of connection between the movable tongue and the said connecting rod being disposed in advance of the tongue pivot, and adjustable means for securing the movable tongue rigidly to its cultivator frame in different angularly adjusted positions.

In testimony whereof I affix my signature in presence of two witnesses.

MARTIN W. SHOGREN.

Witnesses:
   FRED W. SCHNARTER,
   WILLIAM OSSENKOP.

---

Copies of this patent may be obtained for five cents each, by addressing the "Commissioner of Patents, Washington, D. C."